Figure 5:
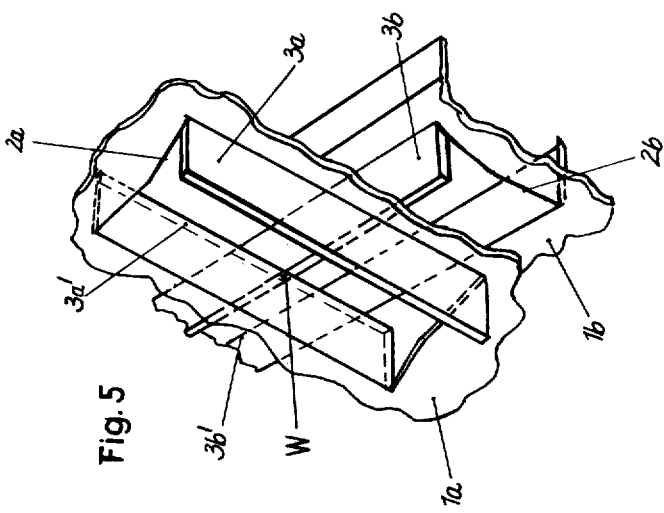

United States Patent [19] [11] 4,337,217
Braun [45] Jun. 29, 1982

[54] CONTACTING ARRANGEMENT FOR MASS TRANSFER OPERATIONS AND SET OF PLATES FOR USE IN SAID ARRANGEMENT

[75] Inventor: Roland Braun, Ludwigshafen-Rheingönheim, Fed. Rep. of Germany

[73] Assignee: Raschig GmbH, Ludwigshafen am Rhein, Fed. Rep. of Germany

[21] Appl. No.: 256,652

[22] Filed: Apr. 22, 1981

[51] Int. Cl.³ .............................................. B01F 3/04
[52] U.S. Cl. ..................................... 261/112; 428/136
[58] Field of Search ............... 261/103, 112, DIG. 72; 210/150, 151; 428/134, 136; 202/158

[56] References Cited

U.S. PATENT DOCUMENTS

| 712,064 | 10/1902 | Heath | 428/136 X |
|---|---|---|---|
| 2,073,556 | 3/1937 | Kivett | 261/103 |
| 2,206,440 | 7/1940 | Walker | 261/112 |
| 2,359,205 | 9/1944 | Cowan | 428/136 X |
| 3,343,821 | 9/1967 | Winn et al. | 261/112 |
| 3,655,501 | 4/1972 | Tesch | 428/136 |
| 4,052,491 | 10/1977 | Lefevre | 261/112 |
| 4,107,241 | 8/1978 | Braun | 261/112 X |
| 4,276,242 | 6/1981 | Chen et al. | 428/134 X |

FOREIGN PATENT DOCUMENTS

| 1283250 | 11/1968 | Fed. Rep. of Germany | 261/112 |
|---|---|---|---|
| 2910525 | 9/1980 | Fed. Rep. of Germany | 261/112 |
| 771047 | 9/1934 | France | 261/112 |

Primary Examiner—Richard L. Chiesa
Attorney, Agent, or Firm—Balogh, Osann, Kramer, Dvorak, Genova & Traub

[57] ABSTRACT

The contacting arrangement comprises at least one set of parallel plates, which are equally spaced apart and extend at an angle to the horizontal. Each of said plates is formed with a plurality of slots, which are arranged in at least two generally parallel rows, which are transversely spaced apart in the vertical direction. Each of said slots is defined on at least one side by a lug, which is bent from said plate. The longitudinal directions of the slots of adjacent rows of each plate are in mutually opposite senses from the vertical.

15 Claims, 5 Drawing Figures

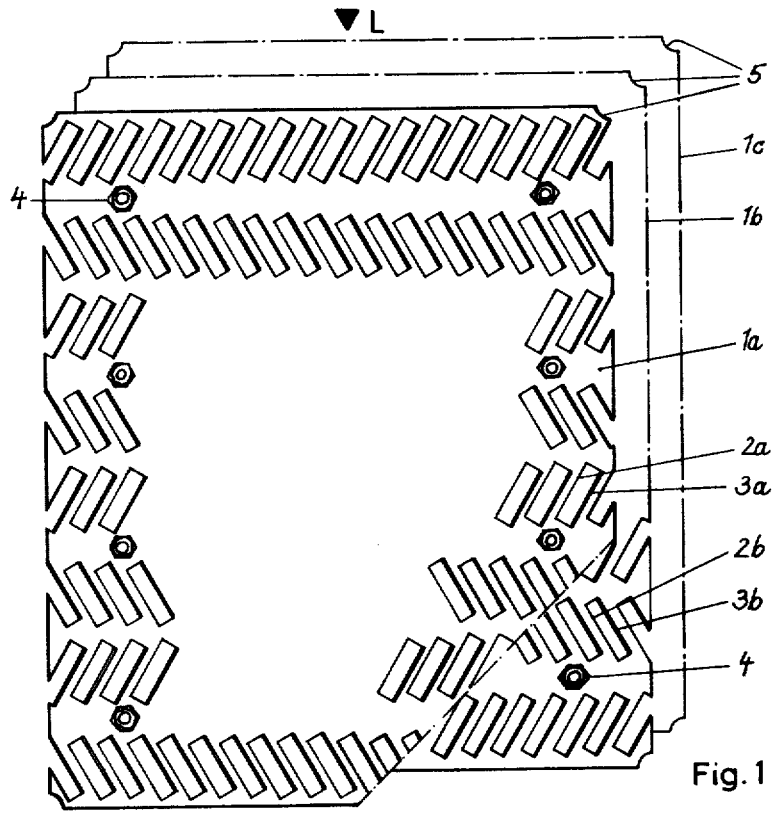
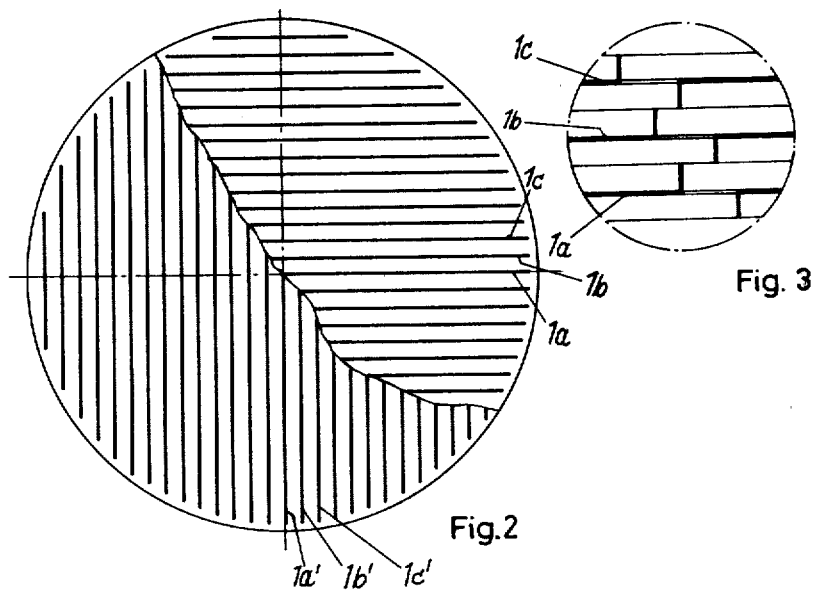
Fig. 1
Fig. 2
Fig. 3

CONTACTING ARRANGEMENT FOR MASS TRANSFER OPERATIONS AND SET OF PLATES FOR USE IN SAID ARRANGEMENT

BACKGROUND OF THE INVENTION

This invention relates to a contacting arrangement for mass transfer operations comprising plates which are particularly vertically oriented and are parallel and equally spaced apart.

U.S. Pat. No. 4,107,241 discloses a contacting arrangement for mass transfer operations comprising superimposed louverlike grates, which are angularly offset and extend transversely to the direction of flow through said arrangement. Each of said grates consists of oblique strips and of connecting elements, which are parallel to themselves and transverse to the oblique strips. Such a contacting arrangement has desirable properties regarding its mass transfer-promoting activity and its hydraulic activity and the pressure loss caused by it. On the other hand it has been found that the assembling of the components involves high manufacturing costs.

It is an object of the invention to provide for mass transfer operations a contacting arrangement which can be manufactured at lower costs, particularly at lower labor costs.

Another object is to provide such a contacting arrangement which has a stronger mixing activity so as to most strongly promote the mass transfer.

In order to accomplish these objects, a contacting arrangement for mass transfer operations comprising vertical plates which are parallel and equally spaced apart is improved in accordance with the invention in that each of the plates is formed with slots, which are arranged in vertically spaced apart rows, the longitudinal directions of the slots in adjacent rows are inclined from the vertical in opposite senses, and each of said slots is defined by at least one lug, which is bent from the plate at right angles thereto. Adjacent tongues associated with a row of slots are preferably bent to mutually opposite sides of the plate. Each slot nay be defined on opposite sides of the slot by two of said lugs, which are bent to opposite sides of the plate, preferably at right angles to the plate. The lugs may be bent in arcuate shape on a radius or at an angle, particularly a right angle, from the plate.

Such a contacting arrangement has particularly desirable hydraulic and other properties. The plates can be stamped in one operation and can then be assembled by crossties or other known means to form the sets. To control the width of the plates, a continuous strip which leaves the press may be cut to desired lengths by means of plate shears. The sets of plates held together by crossties can readily be placed on conventional carrying grates in the columns. On these sets of plates placed on a grate, upper sets of plates are placed, which extend at an angle to the next lower set of plates.

Having slots which have preferably the configuration of narrow upright rectangles and are defined by lugs bent to opposite sides of the plate in alternation, the plates may be so arranged that the slots in corresponding rows of adjacent plates are inclined in opposite senses and the inclined lugs which abut each other between the plates form mixing and turbulence-generating nips for the flowing fluids. The flowing liquid or gas stream is divided at each of the crossings of aperture-defining lugs of adjacent plates and the mixing and turbulence-generating nips formed by said lugs result in a considerable improvement of the mass transfer. The oblique slots and the lugs defining them have suitably an inclination of 15 to 45 degrees from the vertical.

Figure 4:
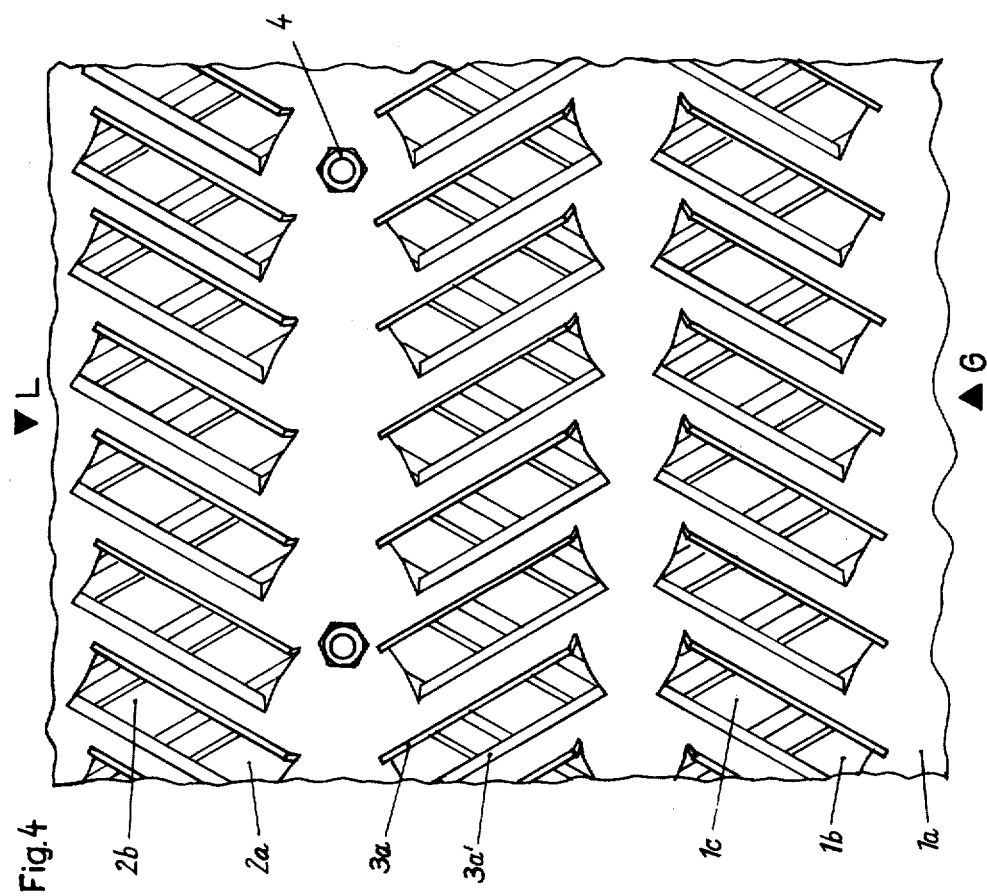

A preferred embodiment of the invention will now be described by way of example with reference to the drawing, in which FIG. 1 is a fragmentary side elevation showing parts of the foremost and second plates of a set of plates of a contacting arrangement, FIG. 2 is a top plan view showing superimposed sets of plates as shown in FIG. 1, FIG. 3 is a fragmentary top plan view showing a portion of the set of plates of FIG. 1, FIG. 4 is a fragmentary side elevation showing on a larger scale a portion of a plate of FIG. 1 and FIG. 5 is a perspective view showing oblique lugs of the set of plates shown in FIG. 1.

It is particularly apparent from FIG. 1 that the parallel vertical plates 1b, 1b etc., which are equally spaced apart, comprise rows of slots 2a, 2b etc. The longitudinal directions of the slots of adjacent rows are inclined in opposite senses. The rows of slots in each plate lie one above the other. Each slot 2a, 2b, etc. is defined on one side by a lug 3a, 3b etc., which is bent from the plate 1a, 1b, etc. at right angles thereto. Alternatively, each oblique slot 2a, 2b, etc. may be defined on opposite sides by two lugs 3a, 3a', 3b, 3b' etc., which are bent from the plate 1a, 1b, etc. to opposite sides thereof, as is apparent, e.g., from FIGS. 4 and 5. The lugs may be bent from the plate at right angles, as is shown here, or arcuately so as to form a radius. The oblique slots 2 defined by the lugs 3 have suitably an inclination of 15 to 45 degrees from the vertical.

As is also apparent from FIG. 1, the plates 1a, 1b etc. having oblique slots 2a, 2b etc., which are defined by lugs 3a, 3b etc. bent to opposite sides of the plate, are so designed that the longitudinal directions of the slots of corresponding rows of adjacent plates 1a, 1b cross each other so that the crossing lugs 3a, 3a' and 3b, 3b' etc. abut between the plates 1a, 1b etc. to form nips W, where the liquid flowing in the direction indicated by the triangle L and the gas flowing in the direction indicated by the triangle G are mixed and subjected to turbulence. As is apparent from FIG. 1, the oblique slots 2a, 2b etc. have the configuration of preferably narrow, generally upright rectangles.

The parallel plates 1a, 1b etc. having crossing oblique lugs 3a, 3b etc. are interconnected by crossties, such as bolts extending through holes 4, to form a set of parallel plates. Such sets of parallel plates 1a, 1b etc. and 1a', 1b' etc. are then placed one over the other in such a manner that the plates 1a, 1b etc. cross the plates 1a', 1b' etc. The plates are formed at each corner with a concave recess 5. These recesses receive sealing cords, which extend around the set of plates and serve to minimize the flow of fluid between the contacting arrangement and the inside surface of the column wall.

In cylindrical columns, the plates decrease in width toward opposite sides of the set so that the latter conforms to the circular cross-section of the column, as is apparent from FIG. 2.

FIG. 3 is a fragmentary view showing a portion of the arrangement of FIG. 1.

FIG. 5 shows crossing lugs 3a, 3a' and 3b, 3b' at oblique slots 2a, 2b of plates 1a, 1b. The crossing lugs 3a', 3b define a mixing and turbulence-imparting nip W.

The plates 1a, 1b etc. are preferably made from metal or plastic material but may also be made of resin-impregnated paperboard or the like.

What is claimed is:

1. In a contacting arrangement for mass transfer operations comprising a set of equally spaced apart parallel plates, the improvement comprised in that:

each of said plates is formed with a plurality of slots which are arranged in at least two transversely spaced apart, generally parallel rows, each of said slots is defined on at least one side by a lug which is bent from said plate, and the longitudinal directions of the slots of adjacent rows of each plate are inclined in opposite senses from the normal on the longitudinal direction of said rows, adjacent lugs associated with a given row of slots being bent from said plate toward opposite sides thereof, corresponding lugs of adjacent plates crossing each other so as to define nips for mixing and imparting turbulence to fluids flowing between said plates.

2. The improvement set forth in claim 1, wherein said lugs are bent off said plates at right angles thereto.

3. The improvement set forth in claim 1, wherein each of said slots is defined on opposite sides by lugs bent from said plate toward opposite sides thereof.

4. The improvement set forth in claim 4, wherein said lugs are bent from said plate at right angles thereto.

5. The improvement set forth in claim 1, wherein said rows are straight and the longitudinal direction of each of said slots includes an angle of 15 to 45 degrees with the normal on the longitudinal direction of said rows.

6. The improvement set forth in claim 1, wherein said plates are held together by crossties extending through said set.

7. The improvement set forth in claim 1, wherein said rows are straight and the longitudinal direction of each of said slots includes an angle of 15 to 45 degrees with the normal on the longitudinal direction of said rows.

8. The improvement set forth in claim 1, wherein each of said plates is rectangular and has corner portions formed with concave recesses adapted to receive a sealing member which extends around the set of plates.

9. The improvement set forth in claim 1 as applied to a set of plates for use in a cylindrical mass transfer column, wherein said plates decrease in width toward opposite sides of the set so that the set of plates is circular in cross-section.

10. The improvement set forth in claim 1, wherein said plates consist of metal.

11. The improvement set forth in claim 1, wherein said plates consist of plastic material.

12. In a contacting arrangement for mass transfer operations comprising at least one set of parallel plates which are equally spaced apart and extend at an angle to the horizontal, the improvement comprised in that:

each of said plates is formed with a plurality of slots, which are arranged in at least two generally parallel rows, which are transversely spaced in the vertical direction, each of said slots is defined on each side by a lug which can be bent from said plate, and the longitudinal directions of the slots of adjacent rows of each plate are inclined from the vertical in mutually opposite senses, corresponding lugs of adjacent plates crossing each other to define nips or mixing and imparting turbulence to fluids flowing between said plates.

13. The improvement set forth in claim 12, wherein adjacent lugs associated with a given row of slots are bent from said plate toward opposite sides thereof.

14. The improvement set forth in claim 12, wherein the longitudinal direction of each of said slots includes an angle of 15 to 45 degrees with the vertical.

15. The improvement set forth in claim 12, wherein said plates are vertical.

* * * * *